United States Patent
Hatada et al.

(10) Patent No.: US 12,515,330 B2
(45) Date of Patent: Jan. 6, 2026

(54) ROBOT CONTROL DEVICE

(71) Applicant: FANUC CORPORATION, Yamanashi (JP)

(72) Inventors: Masanobu Hatada, Yamanashi (JP); Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 18/681,932

(22) PCT Filed: Sep. 17, 2021

(86) PCT No.: PCT/JP2021/034418
§ 371 (c)(1),
(2) Date: Feb. 7, 2024

(87) PCT Pub. No.: WO2023/042399
PCT Pub. Date: Mar. 23, 2023

(65) Prior Publication Data
US 2024/0342907 A1    Oct. 17, 2024

(51) Int. Cl.
*B25J 9/16*      (2006.01)
*B23K 26/08*    (2014.01)
(Continued)

(52) U.S. Cl.
CPC ......... *B25J 9/1656* (2013.01); *B23K 37/0229* (2013.01); *B25J 15/0019* (2013.01); *B25J 13/06* (2013.01)

(58) Field of Classification Search
CPC ...... B25J 9/1656; B25J 15/0019; B25J 13/06; B25J 9/1679; B23K 37/0229; B23K 26/0884; G05B 2219/45165
See application file for complete search history.

(56) References Cited

U.S. PATENT DOCUMENTS

| 2007/0023404 A1* | 2/2007 | Takahashi | G05B 19/414 |
| | | | 700/166 |
| 2008/0223831 A1* | 9/2008 | Yoshikawa | B23K 26/0884 |
| | | | 219/121.64 |

(Continued)

FOREIGN PATENT DOCUMENTS

| JP | 2001-62580 | 3/2001 |
| JP | 2007-30031 | 2/2007 |

(Continued)

OTHER PUBLICATIONS

International Search Report (ISR) issued Oct. 26, 2021 in International (PCT) Application No. PCT/JP2021/034418.

*Primary Examiner* — Harry Y Oh
(74) *Attorney, Agent, or Firm* — Wenderoth, Lind & Ponack, L.L.P.

(57) ABSTRACT

A robot control device 30 controls a robot 40 provided with a laser oscillator 42, and comprises a storage unit 355, a selection unit 320, and a processing unit 356. The storage unit 355 stores, for each of models A-C of the laser oscillator 42, processing programs P1, P3 for executing processing to bring the laser oscillator 42 from a state of no processing to a state of completed processing. The selection unit 320 is configured to be capable of selecting the models A-C. The processing unit 356 reads, from the storage unit 355, the processing programs P1a-P1c, P3a-P3c corresponding to the model A-C selected by the selection unit 320 and executes said programs.

6 Claims, 6 Drawing Sheets

(51) Int. Cl.
*B23K 37/02* (2006.01)
*B25J 13/06* (2006.01)
*B25J 15/00* (2006.01)

(56) References Cited

U.S. PATENT DOCUMENTS

| | | | | |
|---|---|---|---|---|
| 2012/0255937 A1* | 10/2012 | Oe | ......................... | B23K 26/08 |
| | | | | 901/42 |
| 2012/0255938 A1* | 10/2012 | Oe | ..................... | B23K 26/0884 |
| | | | | 901/41 |
| 2014/0307751 A1* | 10/2014 | Miyata | ............... | B23K 26/0626 |
| | | | | 372/19 |

FOREIGN PATENT DOCUMENTS

| | | | |
|---|---|---|---|
| JP | 2010-117982 | | 5/2010 |
| JP | 2010117982 A | * | 5/2010 |
| JP | 2014-205172 | | 10/2014 |

* cited by examiner

ROBOT CONTROL DEVICE

TECHNICAL FIELD

The present invention relates to a robot control device that controls a robot that includes a laser oscillator.

BACKGROUND ART

Some industrial robots include a machining nozzle on an arm and perform machining by irradiating a laser from the machining nozzle onto a steel sheet or the like. The laser that is output from a laser oscillator is input to the machining nozzle.

Patent Document 1: Japanese Unexamined Patent Application, Publication No. 2007-30031

DISCLOSURE OF THE INVENTION

Problems to be Solved by the Invention

A laser oscillator cannot output a laser in an initial state in which a power source is only turned on. Therefore, it is necessary to execute a predetermined start-up process to change the laser oscillator from the initial state to a preparation complete state in which laser output is possible. However, a start-up process thereof may vary depending on a model of the laser oscillator. Further, a shut-down process that returns a laser oscillator from a preparation complete state to an initial state may also vary depending on the model of the laser oscillator.

Therefore, it is necessary to introduce a programmable logic controller (PLC)into a control device of a robot and for a system designer to create a processing program such as a start-up program or a shut-down program by using ladder logic programming or the like each time in accordance with a model of a laser oscillator to be used.

Also, even in a case in which one robot uses a plurality of laser oscillators separately according to use at each production site, it is necessary for a system designer to prepare a processing program such as a start-up program or a shut-down program for each model of a laser oscillator to be used.

The present disclosure has been made in view of the above circumstances, and an object of the present disclosure is to reduce the work of an operator by eliminating the need for an operator such as a system designer to create a processing program such as a start-up program or a shut-down program each time in accordance with a model of a laser oscillator to be used.

Means for Solving the Problems

According to a first disclosure, there is provided a robot control device that controls a robot that includes a laser oscillator, including: a memory unit that stores, for each model of the laser oscillator, a processing program for executing a process that changes the laser oscillator from an unprocessed state to a process complete state; a selection unit that is configured to be able to select the model; and a processor that reads out from the memory unit and executes the processing program that corresponds to a model selected by the selection unit.

According to the first disclosure, when a model is selected by the selection unit, a processing program that corresponds to the selected model can then be executed by the processor. Therefore, it is not necessary for an operator to create the processing program each time in accordance with the model of the laser oscillator to be used, thereby reducing work.

According to a second disclosure, there is provided a robot control device that controls a robot that includes a laser oscillator, including: a memory unit that stores, for each respective model of the laser oscillator, a start-up processing program for executing a process that changes the laser oscillator from an initial state, in which laser output is impossible, to a preparation complete state, in which laser output is possible, and a shut-down processing program for executing a process that returns the laser oscillator from the preparation complete state to the initial state; a selection unit that is configured to be able to select the model; and a processor that reads out from the memory unit and executes the start-up processing program that corresponds to a selected model selected by the selection unit and the shut-down processing program that corresponds to the selected model.

According to the second disclosure, when a model is selected by the selection unit, a start-up processing program and a shut-down processing program that correspond to the selected model can be executed later by the processor. Therefore, it is not necessary for the operator to create the start-up processing program and the shut-down processing program each time in accordance with the model of the laser oscillator to be used, thereby reducing work.

PREFERRED MODE FOR CARRYING OUT THE INVENTION

Hereinafter, embodiments of the present invention are described with reference to the accompanying drawings. However, the present invention is not limited to the following embodiments, and can be appropriately modified and implemented without departing from the gist of the present invention.

First Embodiment

Figure 1:
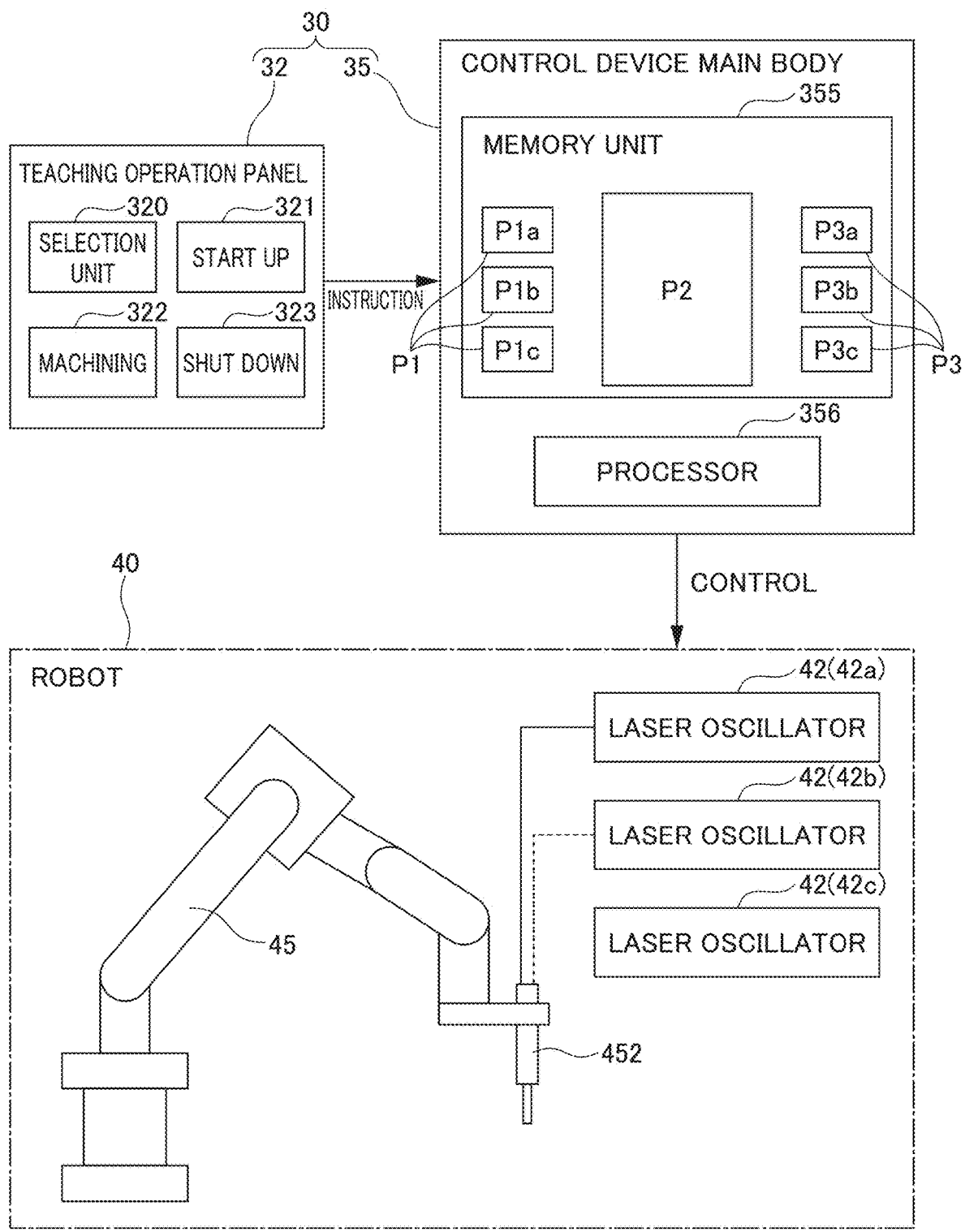
FIG. 1 is a block diagram showing a robot control device and a periphery thereof of a first embodiment.

As shown in FIG. 1, a robot 40 includes a plurality of laser oscillators 42 and an arm 45. Here, the plurality of laser oscillators 42 is three laser oscillators that are a model A of a laser oscillator 42*a*, a model B of a laser oscillator 42*b*, and a model C of a laser oscillator 42*c*, but the number of the plurality of laser oscillators 42 may be two or four or more. Further, the robot 40 may include, for example, only one of the plurality of laser oscillators 42*a*, 42*b*, and 42*c* so as to be interchangeable with other laser oscillators.

Each laser oscillator 42 cannot output a laser with only a power source turned on. Therefore, in order to output the laser from the laser oscillator 42, it is necessary to execute a predetermined start-up process to change the laser oscillator 42 from an initial state, in which laser output is impossible, to a preparation complete state, in which laser output is possible.

The arm 45 includes a machining nozzle 452. One of the plurality of laser oscillators 42a, 42b, and 42c is selectively connected to the machining nozzle 452. The machining nozzle 452 receives and irradiates a laser output from the laser oscillator 42 that is connected.

A robot control device 30 includes a teaching operation panel 32 and a control device main body 35. The teaching operation panel 32 includes a selection unit 320, a start-up instruction unit 321, a machining instruction unit 322, and a shut-down instruction unit 323.

The selection unit 320 is configured to be able to select any model A to C of the laser oscillator 42. That is, an operator can select any model A to C of the laser oscillator 42 by operating the selection unit 320. Hereinafter, the model of the laser oscillator 42 selected by the selection unit 320 is referred to as a "selected model".

The start-up instruction unit 321 is configured to be able to instruct a start-up process of the laser oscillator 42 to start. The start-up process is a process in which the laser oscillator 42 changes from an initial state as an unprocessed state to a preparation complete state as a process complete state. The machining instruction unit 322 is configured to be able to instruct laser machining by the robot 40 to start. The shut-down instruction unit 323 is configured to be able to instruct a shut-down process of the laser oscillator 42 to start. The shut-down process is a process in which the laser oscillator 42 returns from the preparation complete state as the unprocessed state to the initial state as the process complete state.

The teaching operation panel 32 may include the selection unit 320, the start-up instruction unit 321, the machining instruction unit 322, and the shut-down instruction unit 323 in, for example, a touch screen, or may include real buttons.

The control device main body 35 is configured mainly with a computer including a CPU, a RAM, a ROM, and the like, and includes a memory unit 355 and a processor 356.

The memory unit 355 stores, for each of the models A to C of the laser oscillators 42a to 42c that are assumed to be compatible with the robot control device 30, a start-up program P1 that is a start-up processing program and a shut-down program P3 that is a shut-down processing program. That is, the memory unit 355 stores a start-up program P1a and a shut-down program P3a for the model A, a start-up program P1b and a shut-down program P3b for the model B, and a start-up program P1c and a shut-down program P3c for the model C. Further, the memory unit 355 stores a machining program P2. The number of the machining programs P2 is one in the figure, but a plurality of machining programs P2 may be provided depending on the purpose, for example.

When the laser oscillator 42 is instructed, by the operation of the start-up instruction unit 321 by the operator, to start up, the processor 356 reads, from the memory unit 355, and executes the start-up program P1 for the selected model. Therefore, for example, in a case in which the selected model is the model A, when the laser oscillator 42 is instructed to start up, the processor 356 executes the start-up program P1a for the model A. On the other hand, for example, in a case in which the selected model is the model B, when the laser oscillator 42 is instructed to start up, the processor 356 executes the start-up program P1b for the model B.

When laser machining is instructed, by the operation of the machining instruction unit 322 by the operator, to start, the processor 356 executes the machining program P2. Thereby, the robot 40 is controlled to perform laser machining.

When the laser oscillator 42 is instructed, by the operation of the shut-down instruction unit 323 by the operator, to shut down, the processor 356 reads, from the memory unit 355, and executes the shut-down program P3 for the selected model. Therefore, for example, in a case in which the selected model is the model A, when the laser oscillator 42 is instructed to shut down, the processor 356 executes the shut-down program P3a for the model A. On the other hand, for example, in a case in which the selected model is the model B, when the laser oscillator 42 is instructed to shut down, the processor 356 executes the shut-down program P3b for the model B.

Figure 2:
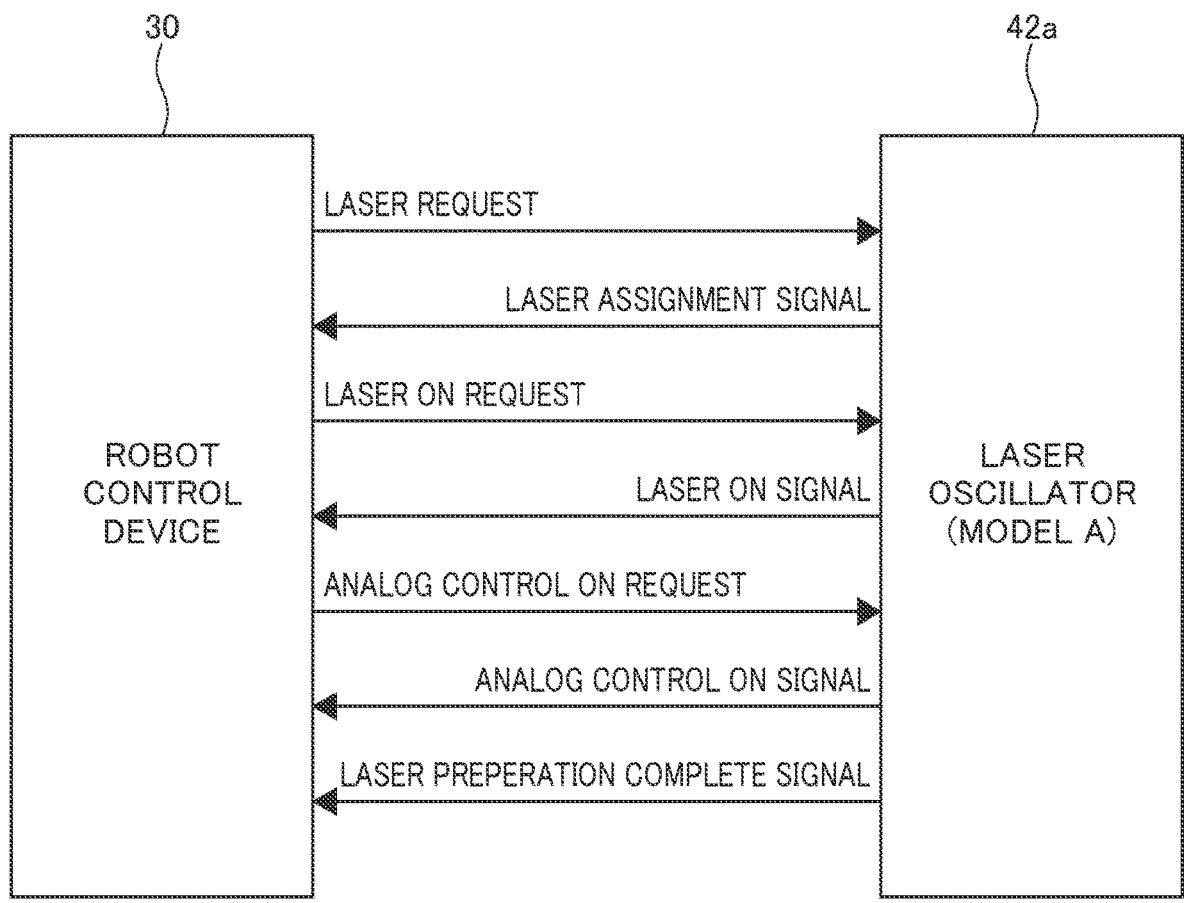
FIG. 2 is a block diagram showing a start-up process for a model A of a laser oscillator.

Next, a start-up process based on the start-up program P1a for the model A is described with reference to FIG. 2. In the start-up process for the model A, the robot control device 30 first transmits, to the laser oscillator 42a, a "laser request" that requests permission for control by the robot control device 30 itself. Upon receiving the "laser request", the laser oscillator 42a permits control on condition that a predetermined requirement is satisfied and transmits a "laser assignment signal" to the robot control device 30. Upon receiving the "laser assignment signal", the robot control device 30 transmits a "laser ON request" to the laser oscillator 42a. Upon receiving the "laser ON request", the laser oscillator 42a changes itself from the initial state to the preparation complete state, and transmits a "laser ON signal" to the laser oscillator 42a. Upon receiving the "laser ON signal", the robot control device 30 transmits, to the laser oscillator 42a, an "analog control ON request" that requests permission for analog control by the robot control device 30 itself. Upon receiving the "analog control ON request", the laser oscillator 42a permits analog control on condition that a predetermined requirement is satisfied, transmits an "analog control ON signal" to the robot control device 30, and transmits a "laser preparation complete signal" to the robot control device 30.

Figure 3:
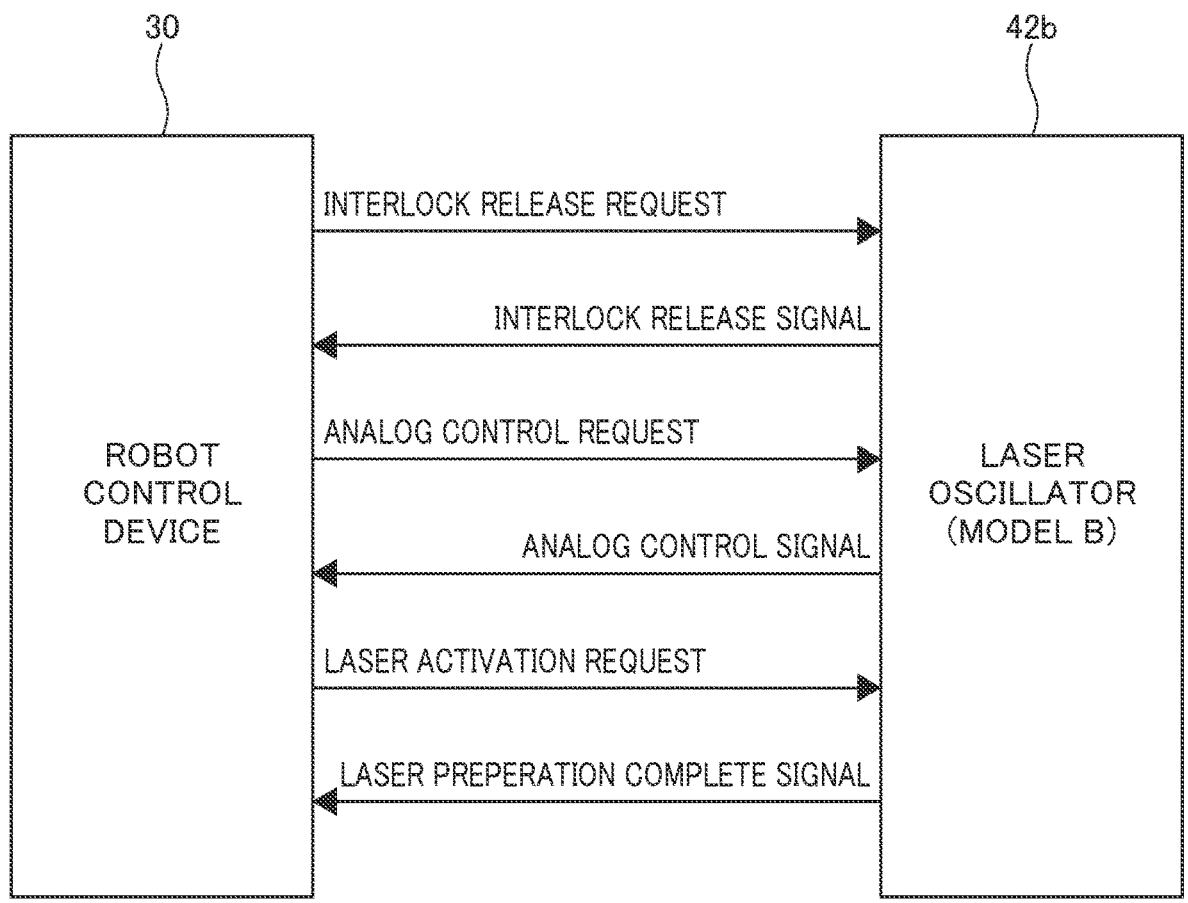
FIG. 3 is a block diagram showing a start-up process for a model B of a laser oscillator.

Next, a start-up process based on the start-up program P1b for the model B is described with reference to FIG. 3. In the start-up process for the model B, the robot control device 30 first transmits an "interlock release request" to the laser oscillator 42b. Upon receiving the "interlock release request", the laser oscillator 42b releases an interlock thereof, on condition that a predetermined requirement is satisfied, and transmits an "interlock release signal" to the robot control device 30. Upon receiving the "interlock release signal", the robot control device 30 transmits, to the laser oscillator 42b, an "analog control request" that requests permission for analog control by the robot control device 30 itself. Upon receiving the "analog control request", the laser oscillator 42b permits analog control on condition that a predetermined requirement is satisfied, and transmits an "analog control signal" to the robot control device 30. Upon receiving the "analog control signal", the robot control device 30 transmits a "laser activation request" to the laser oscillator 42b. Upon receiving the "laser activation request", the laser oscillator 42b changes itself from the initial state to the preparation complete state, and transmits a "laser preparation complete signal" to the laser oscillator 42b.

Figure 4:
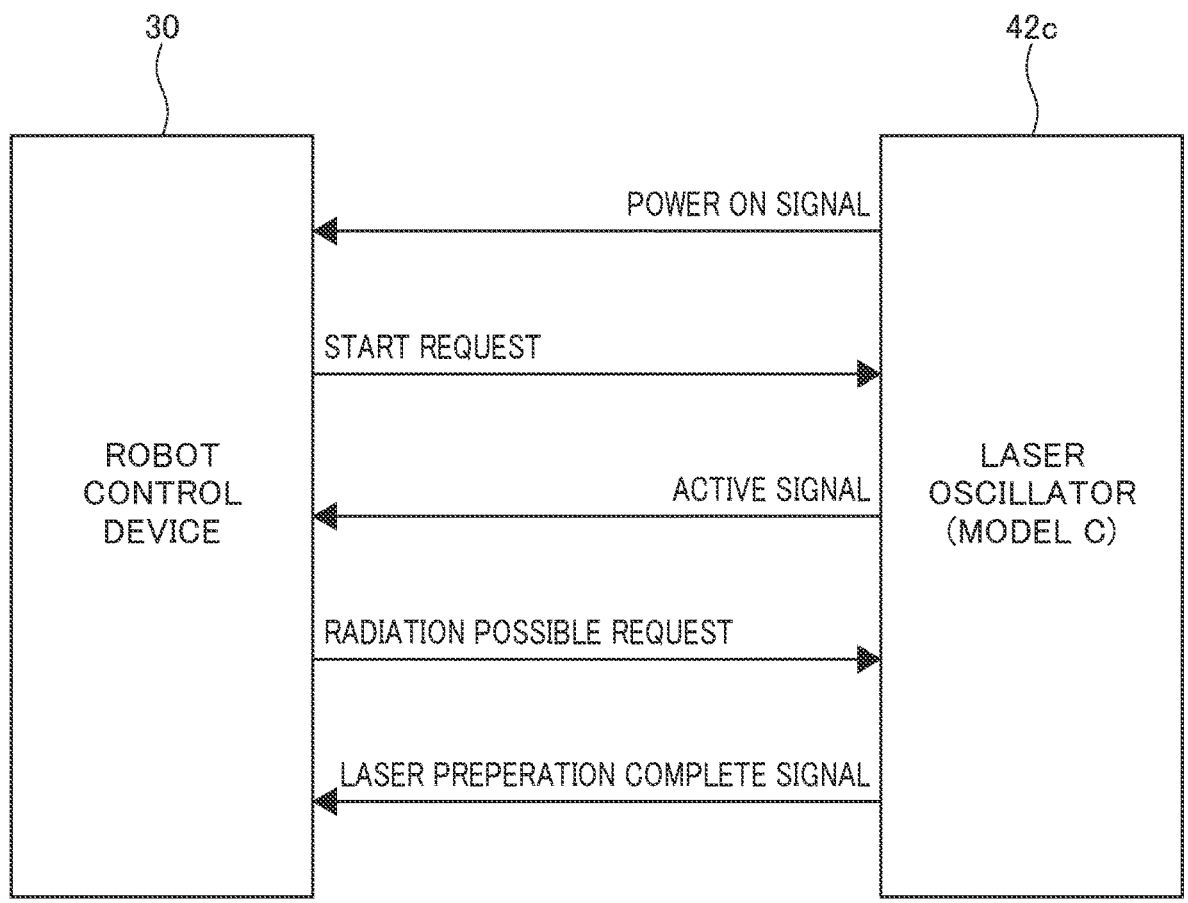
FIG. 4 is a block diagram showing a start-up process for a model C of a laser oscillator.

Next, a start-up process based on the start-up program P1c for the model C is described with reference to FIG. 4. In the start-up process for the model C, the laser oscillator 42c first transmits a "power on signal" to the robot control device 30.

Upon receiving the "power on signal", the robot control device 30 transmits a "start request" to the laser oscillator 42*c*. Upon receiving the "start request", the laser oscillator 42*c* changes itself from the initial state to the preparation complete state, and transmits an "active signal" to the robot control device 30. Upon receiving the "active signal", the robot control device 30 transmits, to the laser oscillator 42*c*, a "radiation possible request" that requests permission for control by the robot control device 30 itself. Upon receiving the "radiation possible request", the laser oscillator 42*c* permits control on condition that a predetermined requirement is satisfied, and transmits a "laser preparation complete signal" to the robot control device 30.

As described above, the laser oscillators 42*a* to 42*c* of the models A to C have different start-up processes. Therefore, the memory unit 355 has different start-up programs P1*a* to P1*c* for each of the models A to C. This also applies to the shut-down programs P3*a* to P3*c*. That is, the storage unit 355 has different shut-down programs P3*a* to P3*c* for each of the models A to C.

Next, a procedure for actually controlling the robot 40 using the robot control device 30 is described with reference to FIG. 1 again. First, the operator connects a desired laser oscillator 42 to the machining nozzle 452. Here, as shown by a solid line in FIG. 1, it is assumed that the model A of the laser oscillator 42*a* is connected to the machining nozzle 452. Next, the operator selects the model of the laser oscillator 42 connected to the machining nozzle 452 (that is, the model A in this case) by operating the selection unit 320.

Next, by operating the start-up instruction unit 321, the operator instructs the laser oscillator 42*a* to start up. Thereby, the start-up program P1*a* for the model A is executed, and the laser oscillator 42*a* enters the preparation complete state from the initial state.

Next, the operator instructs laser machining to start by operating the machining instructing unit 322. Thereby, the processing program P2 is executed, and laser machining is performed on a target object such as a steel sheet.

Next, by operating the shut-down instruction unit 323, the operator instructs the laser oscillator 42*a* to shut down. Thereby, the shut-down program P3*a* for the model A is executed, and the laser oscillator 42*a* returns from the preparation complete state to the initial state.

As described above, according to the present embodiment, for example, when the model A is selected, the start-up process for the model A can be executed by only instructing the laser oscillator 42 to start up, and the shut-down process for the model A can be executed by only instructing the laser oscillator 42 to shut down. On the other hand, for example, when the model B is selected, the start-up process for the model B can be executed by only instructing the laser oscillator 42 to start up, and the shut-down process for the model B can be executed by only instructing the laser oscillator 42 to shut down. Therefore, it is not necessary for the operator to create the start-up program P1 or the shut-down program P3 each time in accordance with the model of the laser oscillator 42 to be used. Therefore, the work of the operator can be reduced.

Second Embodiment

Next, a second embodiment is described with reference to FIG. 5. The present embodiment is described based of the first embodiment by focusing on points that are different from those of the first embodiment, and description of the same or similar portions as those of the first embodiment are appropriately omitted.

In the present embodiment, the teaching operation panel 32 does not include the start-up instruction unit 321 and the shut-down instruction unit 323 as described in the first embodiment. Instead, when the model is selected by the operation of the selection unit 320 by the operator, a control program P that includes a start-up program P1 of the selected model, a machining program P2, and a shut-down program P3 of the selected model is created.

Figure 5:
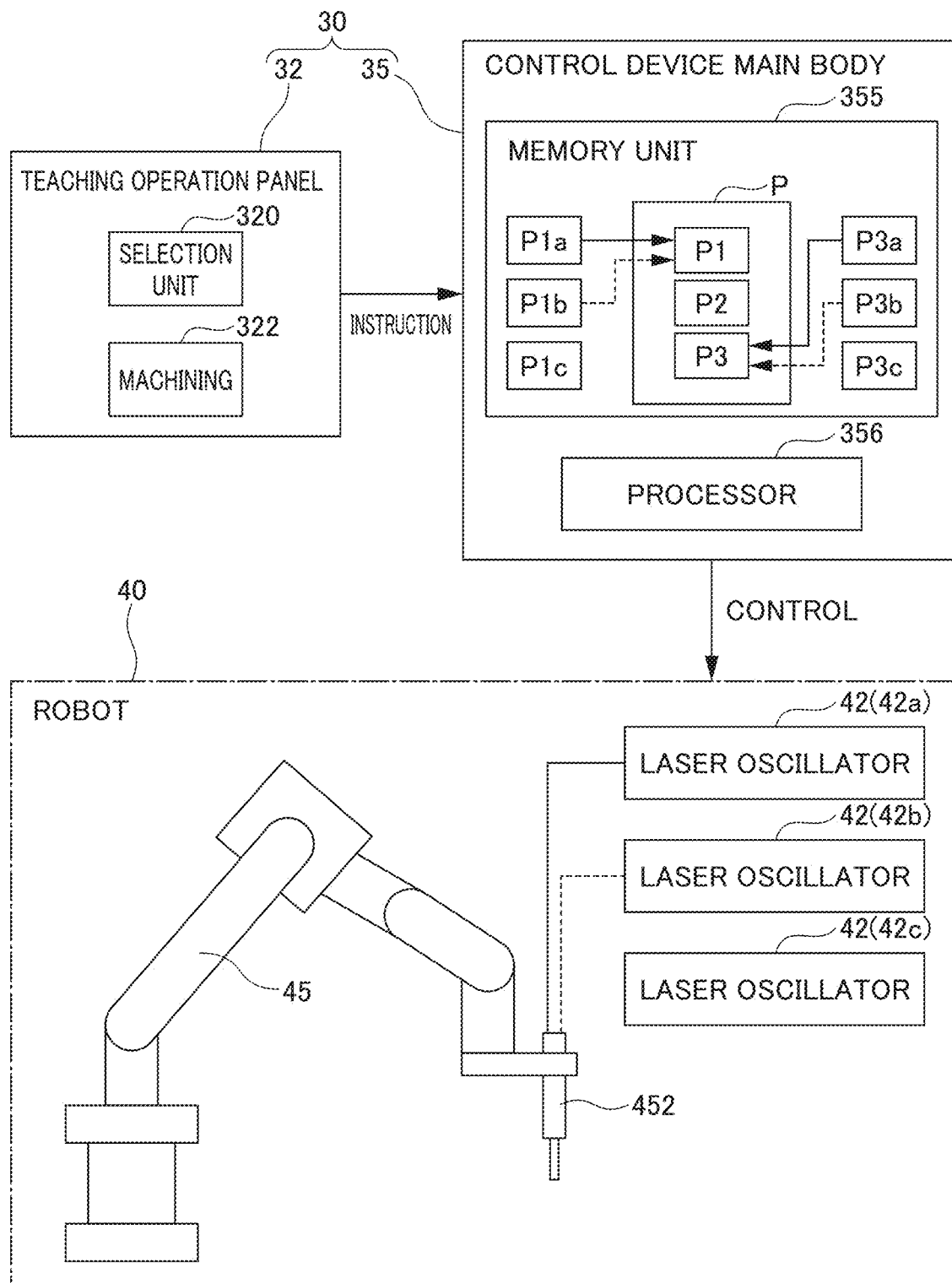
FIG. 5 is a block diagram showing a robot control device and a periphery thereof according to a second embodiment.

That is, for example, when the model A is selected, the control program P that includes the start-up program P1*a* for the model A, the machining program P2, and the shut-down program P3*a* for the model A is created as shown by solid lines in FIG. 5. On the other hand, for example, when the model B is selected, a control program P that includes a start-up program P1*b* for the model B, a machining program P2, and a shut-down program P3*b* for the model B is created as shown by broken lines in FIG. 5.

After that, when laser machining is instructed to start by the operation of the machining instruction unit 322 by the operator, the control program P is executed by the processor 356. Thereby, after the start-up program P1 of the selected model is executed, the machining program P2 is executed, and then the shut-down program P3 of the selected model is executed. That is, when the selected model is the model A, after the start-up program P1*a* for the model A is executed, the machining program P2 is executed, and then the shut-down program P3*a* for the model A is executed. On the other hand, when the selected model is the model B, after the start-up program P1*b* for the model B is executed, the machining program P2 is executed, and then the shut-down program P3*b* for the model B is executed.

As described above, according to the present embodiment, for example, when the model A is selected, the start-up process for the model A, the laser machining process, and the shut-down process for the model A can be executed in order of the start-up process for the model A, the laser machining process, and the shut-down process for the model A by only instructing the laser machining to start. On the other hand, for example, when the model B is selected, the start-up process for the model B, the laser machining process, and the shut-down process for the model B can be executed in order of the start-up process for the model B, the laser machining process, and the shut-down process for the model B by only instructing the execution of the laser machining to start. Therefore, the work of the operator can be reduced as compared with the first embodiment.

Moreover, according to the present embodiment, because the start-up program P1, the processing program P2, and the shut-down program P3 are incorporated in the control program P, the start-up process and the shut-down process can be performed in synchronization with the laser machining processing without waste.

Third Embodiment

Next, a third embodiment is described with reference to FIG. 6. The present embodiment is described based of the second embodiment by focusing on points that are different from those of the second embodiment, and description of the same or similar portions as those of the second embodiment are appropriately omitted.

Figure 6:
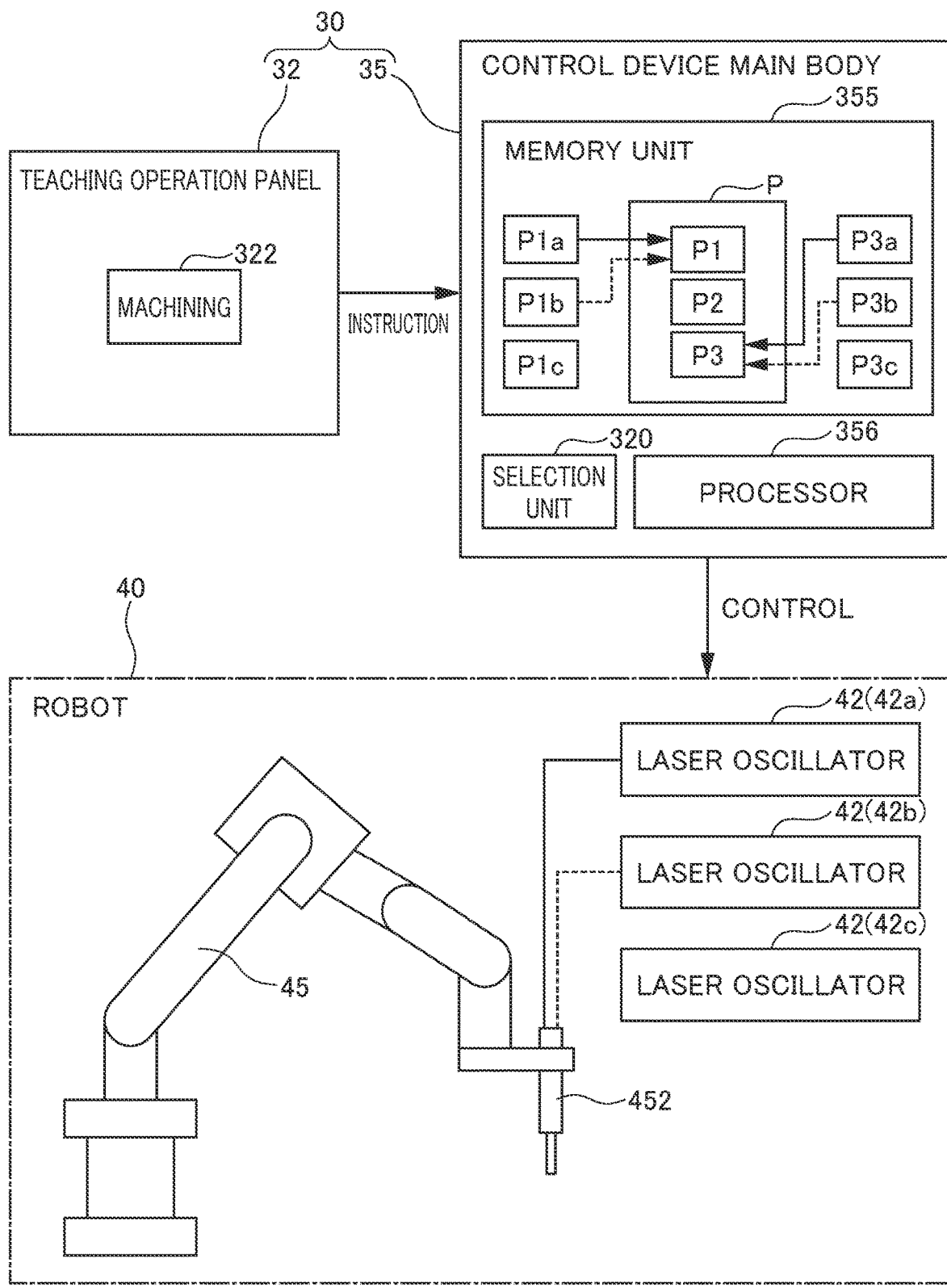
FIG. 6 is a block diagram showing a robot control device and a periphery thereof according to a third embodiment.

As shown in FIG. 6, in the present embodiment, the teaching operation panel 32 does not include the selection unit 320, and instead, the control device main body 35 includes the selection unit 320. The selection unit 320 automatically recognizes a model of the models A to C of the laser oscillator 42 that is connected to the machining nozzle 452 from the connection status, and selects the recognized model of the models A to C.

That is, for example, as shown by solid lines in FIG. 6, when the model A of the laser oscillator 42a is connected to the machining nozzle 452, the selection unit 320 automatically selects the model A, and the control program P that includes the start-up program P1a for the model A, the processing program P2, and the shut-down program P3a for the model A is created. On the other hand, as shown by broken lines in FIG. 6, when the model B of the laser oscillator 42b is connected to the machining nozzle 452, the selection unit 320 automatically selects the model B, and the control program P that includes the start-up program P1b for the model B, the machining program P2, and the shut-down program P3b for the model B is created.

After that, as in the case of the second embodiment, when laser machining is instructed, by the operation of the machining instructing unit 322 by the operator, to start, the control program P is executed by the processor 356. Thereby, after the start-up program P1 of the selected model is executed, the machining program P2 is executed, and then the shut-down program P3 of the selected model is executed.

According to the present embodiment, even the time and effort of the operator in selecting the models A to C can be reduced.

Other Embodiments

The above embodiments can for example be modified as follows.

The memory unit 355 stores only one of the start-up program P1 and the shut-down program P3 for each of the models A to C, and another one of the start-up program P1 and the shut-down program P3 for each of the models A to C may be shared by the models A to C.

Among some of the three or more models, the start-up programs P1 may be the same or shared, and the shut-down programs P3 may also be the same or shared. That is, for example, the start-up program P1a for the model A and the start-up program P1b for the model B may be the same or shared, and only the start-up program P1c for the model C may be different from the start-up programs P1a and P1b for the models A and B.

A portion of the machining program P2 may also be different for each of the models A to C. That is, the memory unit 355 may store a portion of the machining program P2 as a processing program that is different for each of the models A to C, and the processing program may be set based on the selected model.

EXPLANATION OF REFERENCE NUMERALS 30 robot control device
32 teaching operation panel
320 selection unit
321 start-up instruction unit
322 machining instruction unit
323 shut-down instruction unit
35 control device main body
355 memory unit
356 processor
40 robot
42 laser oscillator
42a model A of laser oscillator
42b model B of laser oscillator
42c model C of laser oscillator
45 arm
452 machining nozzle
P1 start-up program
P1a start-up program for model A
P1b start-up program for model B
P1c start-up program for model C
P2 machining program
P3 shut-down program
P3a shut-down program for model A
P3b shut-down program for model B
P3c shut-down program for model C

The invention claimed is:

1. A robot control device that controls a robot that includes a laser oscillator, comprising:
a non-transitory memory unit that stores, for each of a plurality of models of laser oscillators, a processing program for executing a process that changes a laser oscillator of a corresponding model from an unprocessed state to a process complete state;
a selection unit by which one of the plurality of models is selected by an operator; and
a processor that reads out from the memory unit and executes the processing program that corresponds to a model selected by the selection unit, wherein
the processor, upon a first model being selected by the selection unit, reads out from the memory unit and executes the processing program corresponding to the first model, completing a process of a laser oscillator of the first model changing from the unprocessed state to the process complete state, and
upon a second model that is different from the first model being selected by the selection unit, reads out from the memory unit and executes the processing program corresponding to the second model, completing a process of a laser oscillator of the second model changing from the unprocessed state to the process complete state.

2. The robot control device according to claim 1, wherein the unprocessed state is an initial state in which laser output is not possible, the process complete state is a preparation complete state in which laser output is possible, and
the processing program is a start-up program for executing a start-up process that changes the laser oscillator from the initial state to the preparation complete state.

3. The robot control device according to claim 1, wherein the unprocessed state is a preparation complete state in which laser output is possible, the process complete state is an initial state in which laser output is not possible, and
the processing program is a shut-down program for executing a shut-down process that changes the laser oscillator from the preparation complete state to the initial state.

4. A robot control device that controls a robot that includes a laser oscillator, comprising:
a non-transitory memory unit that stores, for each of a plurality of models of laser oscillators, a start-up processing program for executing a process that changes a laser oscillator of a corresponding model from an initial state in which laser output is not possible to a preparation complete state in which laser output is possible and a shut-down processing program for executing a process that returns a laser oscillator of the corresponding model from the preparation complete state to the initial state;
a selection unit by which one of the plurality of models is selected by an operator; and a processor that reads out from the memory unit and executes the start-up processing program that corresponds to a selected model selected by the selection unit and the shut-down processing program that corresponds to the selected model, wherein the processor, upon a first model being selected by the selection unit, reads out from the memory unit and executes the start-up processing program corresponding to the first model, completing a process of a laser oscillator of the first model changing to the preparation complete state and reads out from the memory unit and executes the shut-down processing program corresponding to the first model, completing a process of a laser oscillator of the first model returning to the initial state, and upon a second model that is different from the first model being selected by the selection unit, reads out from the memory unit and executes the start-up processing program corresponding to the second model, completing a process of a laser oscillator of the second model changing to the preparation complete state and reads out from the memory unit and executes the shut-down processing program corresponding to the second model, completing a process of a laser oscillator of the second model returning to the initial state.

5. The robot control device according to claim 1, wherein the robot control device comprises a teaching operation panel, and the processor starts execution of the processing program based on an operator operating the teaching operation panel.

6. The robot control device according to claim 1, wherein the processor executes the processing program and a machining program by executing a control program that incorporates the processing program that corresponds to the model selected by the selection unit and the machining program for making the robot execute laser machining.

\* \* \* \* \*